E. EKEDAHL.
MUSEUM CASE.
APPLICATION FILED MAR. 23, 1914.

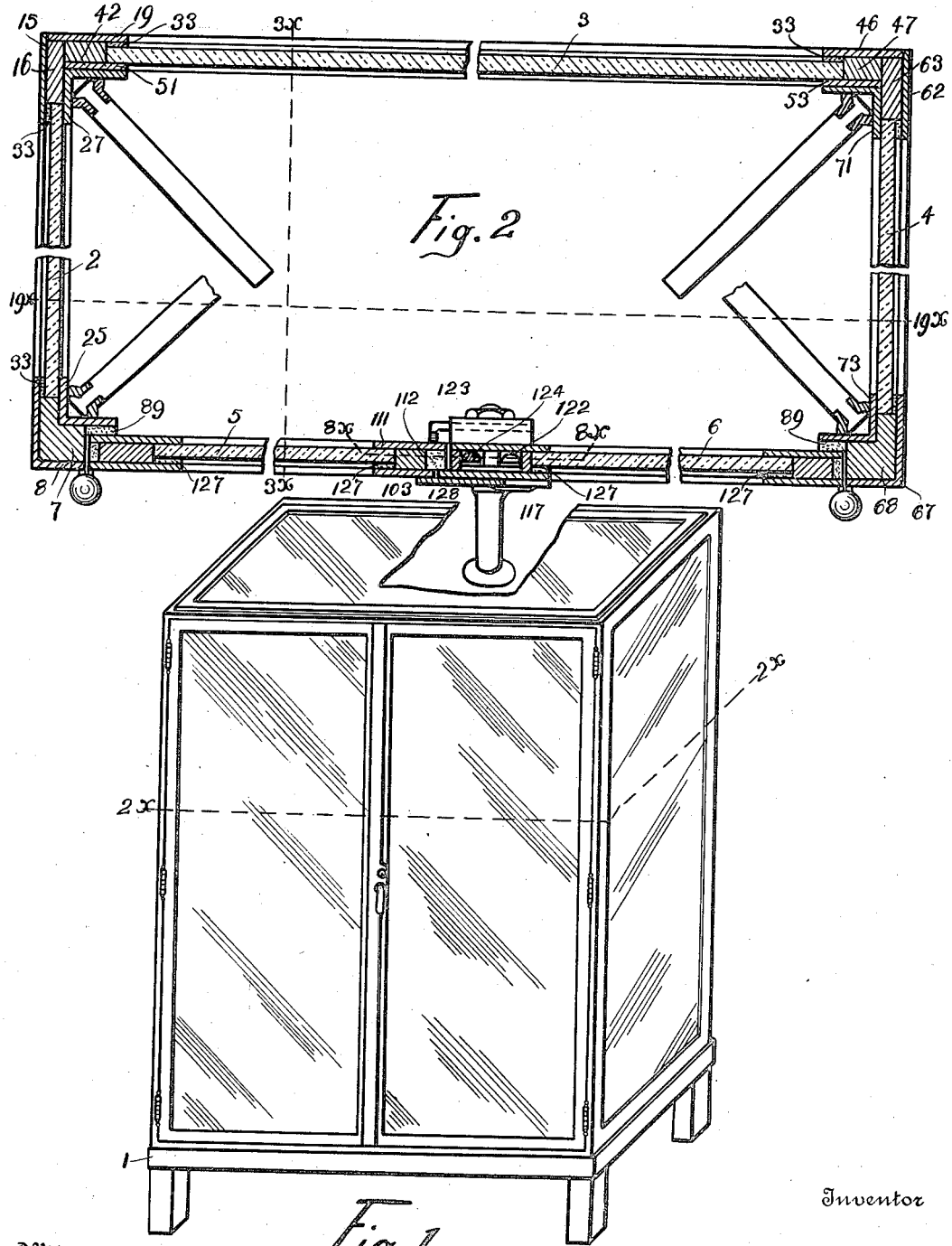

1,146,415.

Patented July 13, 1915.
7 SHEETS—SHEET 2.

Witnesses
Eric Ischinger
Alice M. Johanns

Inventor
Erik Ekedahl
By Frank Keifer
Attorney

E. EKEDAHL.
MUSEUM CASE.
APPLICATION FILED MAR. 23, 1914.
1,146,415.
Patented July 13, 1915.
7 SHEETS—SHEET 3.
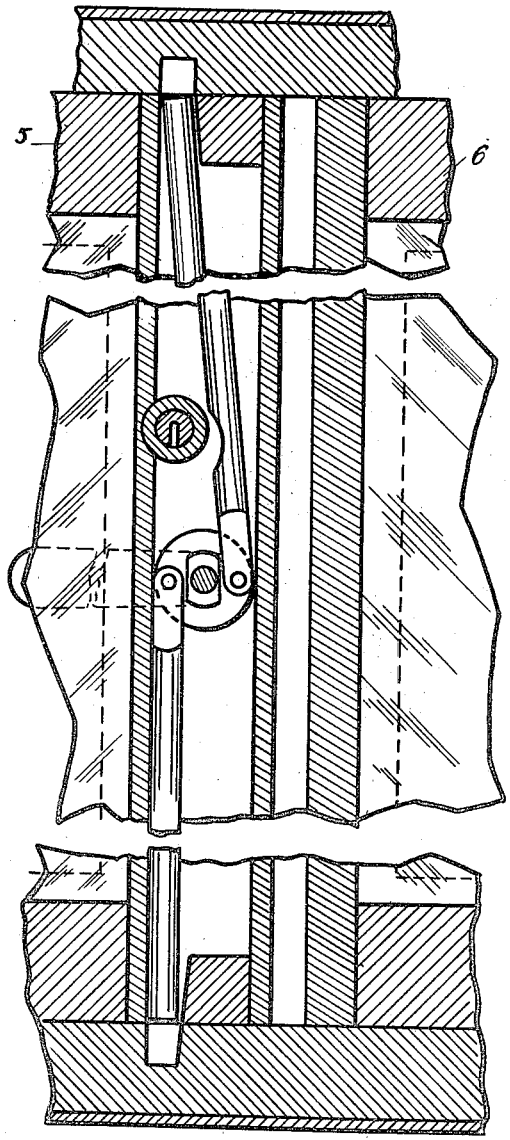
Fig. 8.
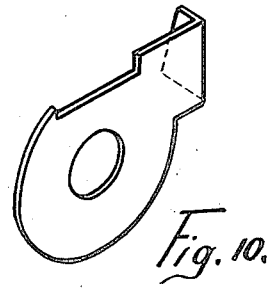
Fig. 10.
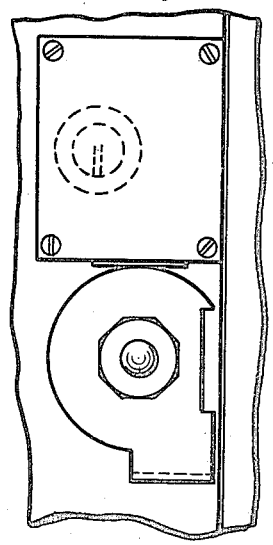
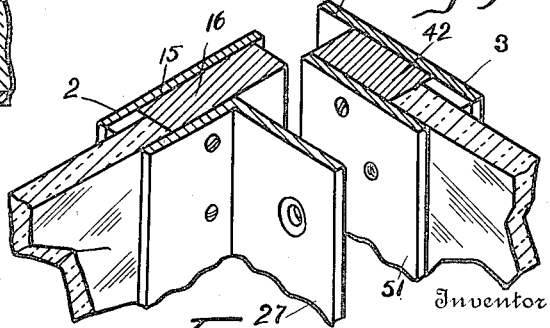
Fig. 9.
Fig. 7.
Witnesses
Eric Ischinger
Alice M. Johann
Inventor
Erik Ekedahl
By Frank Keifer
Attorney

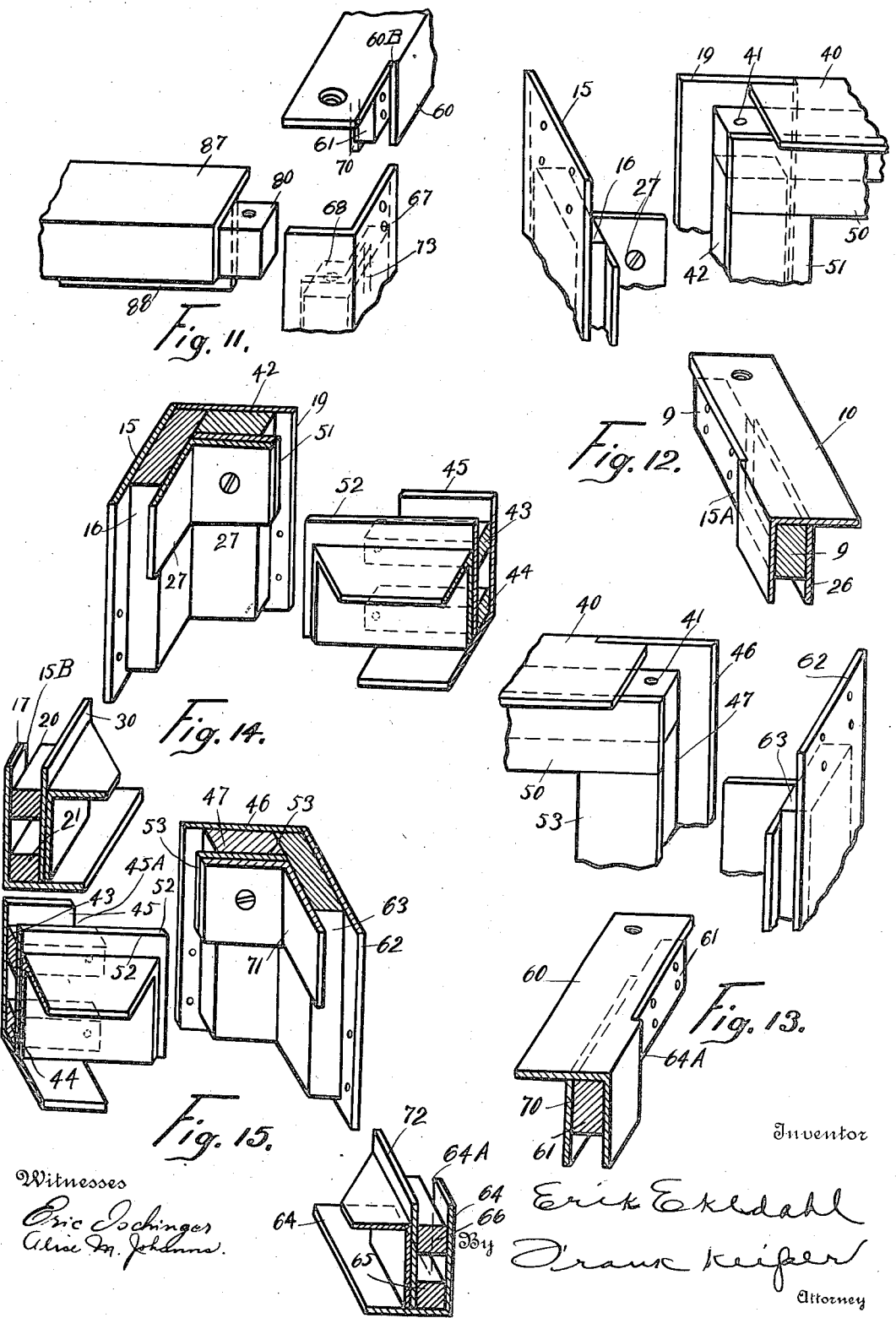

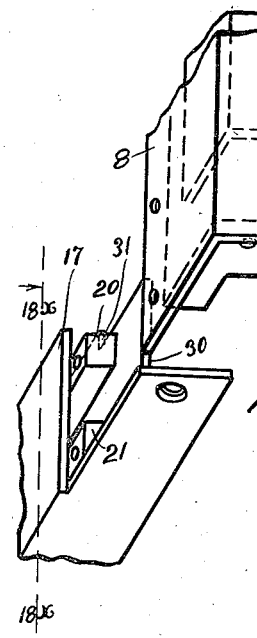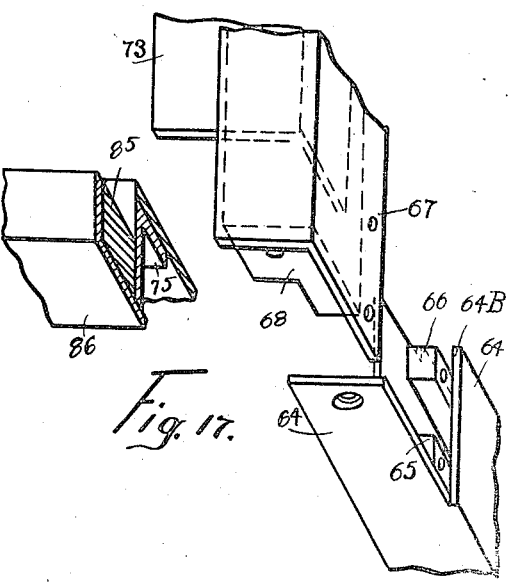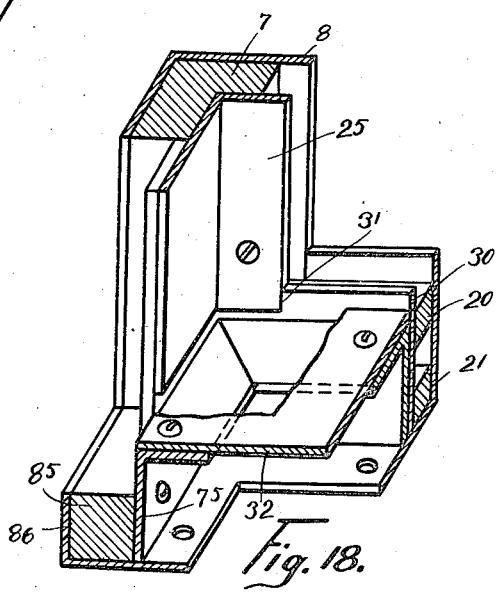

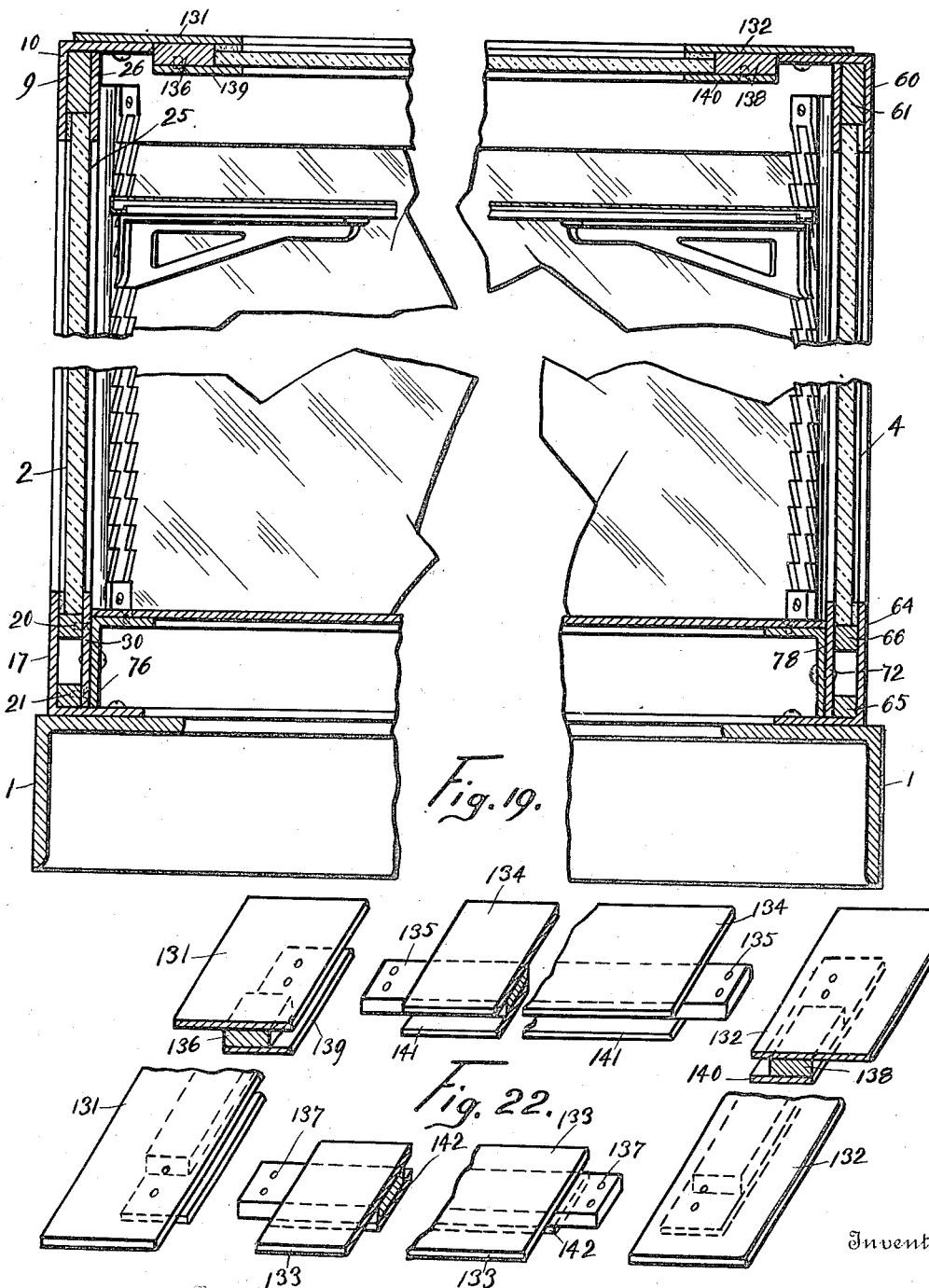

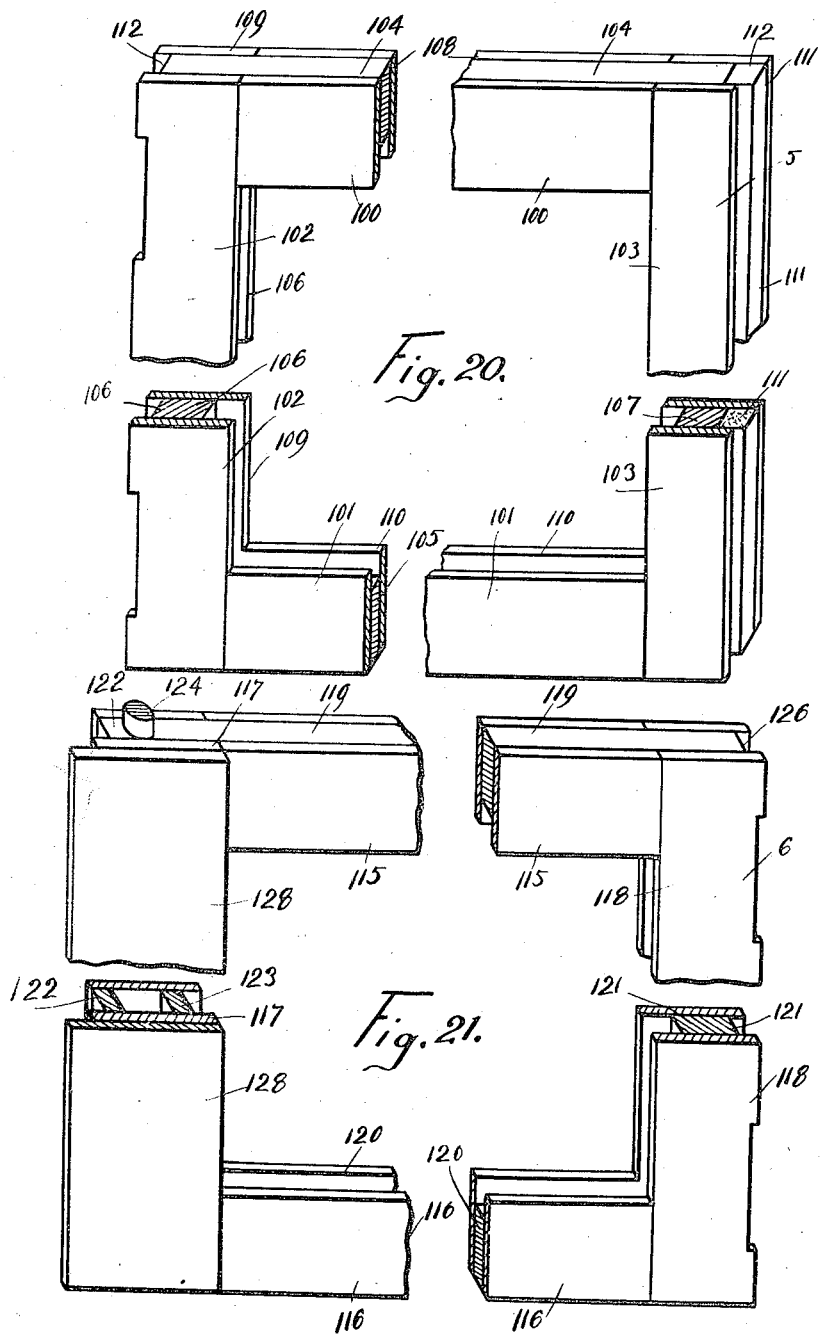

UNITED STATES PATENT OFFICE.

ERIK EKEDAHL, OF JAMESTOWN, NEW YORK, ASSIGNOR TO ART METAL CONSTRUCTION COMPANY, OF JAMESTOWN, NEW YORK, A CORPORATION OF NEW YORK.

MUSEUM-CASE.

1,146,415.    Specification of Letters Patent.    Patented July 13, 1915.

Application filed March 23, 1914. Serial No. 826,723.

*To all whom it may concern:*

Be it known that I, ERIK EKEDAHL, a citizen of the United States, residing at Jamestown, in the county of Chautauqua and State of New York, have invented certain new and useful Improvements in Museum-Cases, of which the following is a specification.

The object of my invention is to provide a museum case having a metallic base, a skeleton metallic framework with glass sides, and a top of either glass or sheet metal.

A further object of my invention is to make a separate metallic frame for each of the glass sides and the top, which frames can be readily connected to or separated from each other in setting the case up or taking it down.

Another object of my invention is to secure the glass firmly within its frame by means of felt packing.

Another object of my invention is to provide the museum case with a suitable base on which the upright panels are positively held.

Another object of my invention is to provide suitable uprights in said museum case with adjustable supports thereon for the shelves.

Another object of my invention is to provide the museum case with suitable bars.

Another object of my invention is to construct the case with unit parts that can be easily detached and knocked down for convenience in packing and shipping, all of which can be quickly set up and fastened together with screws that can be easily placed with the use of a screw driver, the use of no other tools being contemplated.

Another object of my invention is to construct the framework for the glass panels so that stock glass may be secured at any place and may be easily and quickly placed therein in the assembling of the case at any place, thus avoiding the shipment of the panels with the glass complete at the factory.

Another object of my invention is to form the case with certain details of construction and particular combinations of parts, all of which will be hereinafter fully explained and specifically pointed out in the claims.

Figure 3:
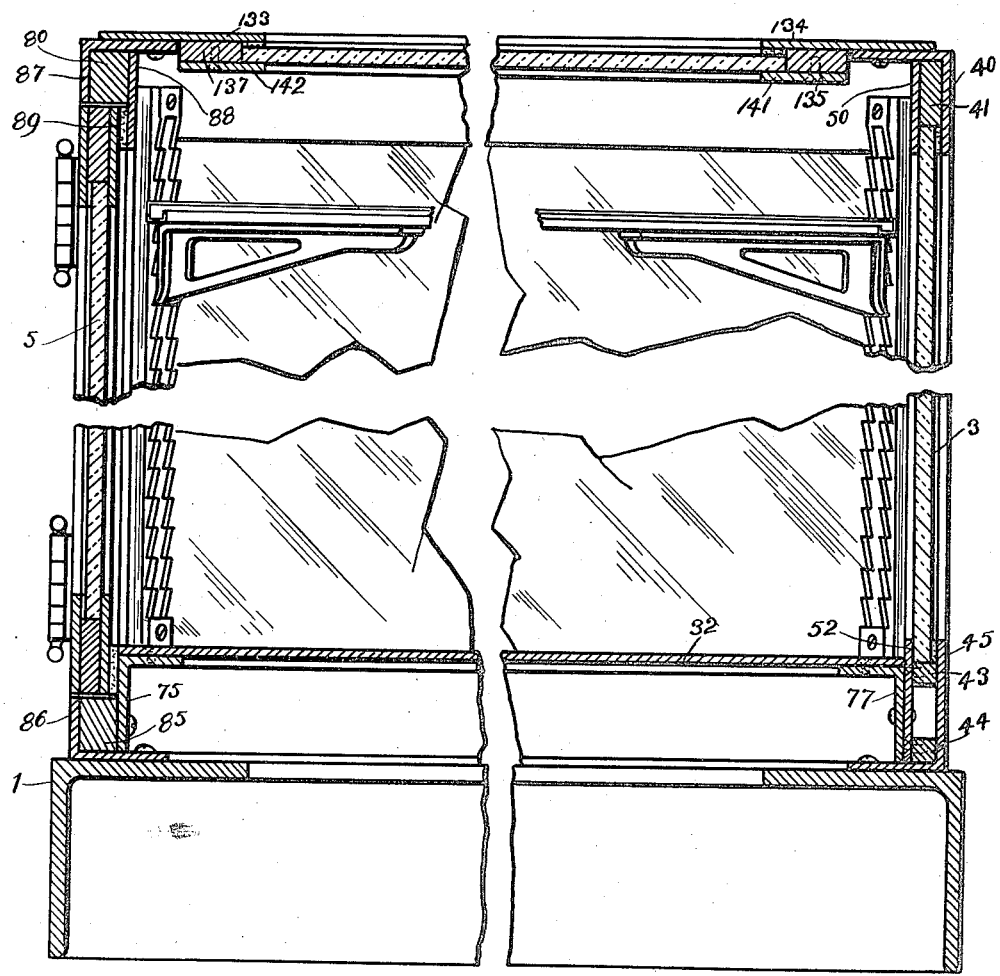
Figure 5:
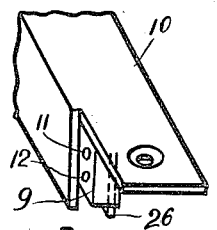
Figure 6:
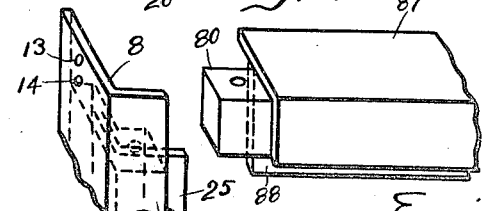
Figure 4:
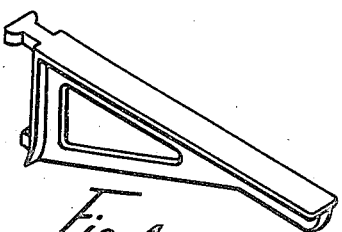

In the accompanying drawings, Figure 1 is a perspective view of the museum case shown complete, partly broken away at the top. Fig. 2 is a horizontal section taken on the line $2^x$—$2^x$ in Fig. 1. Fig. 3 is a section partly broken away on the line $3^x$—$3^x$ in Figs. 1 and 2. Fig. 4 is a perspective view of one of the supporting brackets for the shelf. Fig. 5 is a detail perspective view of a portion of the upright support for the brackets for the shelves. Fig. 6 is a perspective view showing the details of construction by which the two horizontal members and the one upright member are joined together at the front left hand corner of the case at the top looking at the case from lower side of Fig. 2. Fig. 7 is a perspective view of the connection between the end panel and the rear panel, both of them being upright. See upper left hand corner of Fig. 2. Fig. 8 is a sectional view through the doors on the line $8^x$—$8^x$ in Fig. 2. Fig. 9 is a rear view of the locking mechanism. Fig. 10 is a perspective view of the locking dog. Fig. 11 is a perspective view showing the details of construction by which the parts are joined together at the front right hand corner of the case at the top, looking at the case from the lower side of Fig. 2. Fig. 12 is a view of the parts as they are joined together at the rear left hand corner of the case at the top, looking at the case from the lower side of Fig. 2. Fig. 13 is a view of the parts as they are joined together at the rear right hand corner of the case at the top, looking at the case from the lower side of Fig. 2. Fig. 14 is a perspective view of the parts at the bottom corner of the case below the parts shown in Fig. 12. Fig. 15 is a perspective view of the parts at the bottom corner of the case below the parts shown in Fig. 13. Figs. 16 and 17 are perspective views of the frame at the lower left and right hand corners respectively. Fig. 18 is a section on the line $18^x$—$18^x$ in Fig. 16. Fig. 19 is a vertical section on the line $19^x$—$19^x$ of Fig. 2. Figs. 20 and 21 are detail views of the doors. Fig. 22 is a detail of the top panel.

In the accompanying drawings, like reference numerals refer to like parts.

Reference numeral 1 indicates the base which is provided with four legs on which the base is supported. This base is made preferably of angle iron such as is shown in Fig. 3, which angle iron extends around all four sides of the base. On this base is set the upright panels and the platform of the museum case, as will now be described.

The various panels are illustrated in horizontal cross section in Fig. 2. The panel at the left of Fig. 2 will be referred to by the reference numeral 2, the one at the rear by 3 and the one at the right by 4. The doors 5 and 6 are hinged at the front on the left and right respectively.

Each of the panels is made up of an inner and outer frame each of which is a complete integral rectangle, which frames can be joined together to form the panels and inclose the glass plates in the respective panels between the frames. The construction of each of these panels will now be described. The panel 2 has two frames therein. The outer frame is made up of the reinforcing angle 7 to which is riveted or spotwelded the facing angle 8 as shown in Figs. 2 and 6. The facing angle 8 is longer at the top than the reinforcing angle 7 for a purpose that will presently appear. At the top the outer frame of the panel 2 has the reinforcing and spacing bar 9 therein, which is riveted or welded to the angle 10. See Figs. 19 and 6. The angle 10 is cut away as shown in Fig. 6 to form the joint with the angle 8. The angle 8 overlaps the bar 9 to which it is fastened by rivets or screws inserted through the holes 11, 12 and 13, 14.

The shape of the bars 9 and 10 at the rear end is shown in Fig. 12. In Figs. 2, 12 and 14, the plate 15 is shown with the bar 16 riveted thereto. The angle 10 is shown cut away at 15ª, so that the plate 15 can be fastened to the bar 9 by rivets, four holes in the plate 15 and bar 9 being shown for this purpose. At the bottom of the panel 2, the bars 15 and 16 terminate in the manner shown in Fig. 14.

At the bottom of the frame is provided the angle 17 which is cut away at 15ᵇ to receive the bar 15 which extends past it to the base 1. The bottom of the angle 17 extends to the right as shown in Fig. 14, filling the corner between the plate 15 and the plate 19, shown in Fig. 14. On the angle 17 are provided the bars 20 and 21 riveted thereto, which bars overlap the plate 15 and are riveted thereto and abut against the bar 16. Instead of the two narrow bars 20 and 21, a single wide bar or channel may be used. The angle 17 and the bars 20 and 21 terminate at the lower front corner of the frame 2, as shown in Fig. 16, and engage with the upright members 7 and 8 of the frame, as shown in Fig. 16, it being understood that the upright parts shown in Fig. 16 are the continuation of the upright parts shown in Fig. 6.

As shown in Fig. 16, the bars 20 and 21 extend beyond the angle 17 where it is cut away and overlap the angle 8 in Fig. 16 and are riveted thereto. These bars 20 and 21 also abut against the reinforcing angle 7 which is left shorter than the facing angle 8, leaving a space therebelow to receive the extended end of the angle 17 shown in Fig. 16.

The outer frame of the panel 2 is closed in the manner above described. The construction of the inner frame of this panel will now be described.

The inner frame consists of the horizontal upright angle 25 which at the top is left shorter than the reinforcing angle 7. On the edge of this angle 25, at the top, abuts the facing strip 26 at which place the two parts 25 and 26 are welded together. The other end of the strip 26 rests on the angle 27 to the upper end of which it is also welded. See Fig. 12.

The upright angle 25 at the bottom, rests on one side on the plate 30, which is cut away to receive it, as is indicated at 31 in Fig. 18, and to which it is welded. The other side of the angle 25 rests on the plate 32 in the bottom of the case. See Fig. 18. The plate 30 and the angle 27 are welded together, the plate 30 extending through under the angle 27. See Fig. 14.

The inner and outer rectangular frames of the panel 2 can be brought together and a glass plate placed between them of a size to fill the opening included between the spacing and reinforcing bars and angles 7, 9, 16 and 20 which bars and angles are somewhat thicker than the plate to be included therebetween so as to permit of the use of the packing strips which are used in all the panels between the glass and the outer frame of the panel. When the two frames, the glass and packing strips, have been assembled, the frames can be fastened together by screws which pass through the inner frame and into the reinforcing strips, so that no screws show or are accessible on the outside case when it is finished.

The rear panel is formed of two frames as follows: The outer frame is composed at the top of the angle 40 and the reinforcing bar 41. At the left of the panel as shown in Fig. 2, these parts terminate as shown in Fig. 12, the angle 40 being cut away to receive the bar 19 and the bar 41 extending beyond the angle 40. The bar 41 is riveted to the bars 40 and 19. To the bar 19 is riveted the bar 42. At the bottom, the bar 19 is riveted to the bars 43 and 44, the bars 43 and 44 abutting against the bar 42. The bars 43 and 44 are riveted to the angle 45. At the right the angle 45 and bars 43 and 44 terminate as is shown in Fig. 15. The bars 43 and 44 extend beyond the end of the angle 45 at 45ᴬ and overlap the bar 46 to which they are fastened by rivets. See Fig. 15. On the bar 46 is fastened the bar 47 by rivets or welding as is shown in Fig.

15, the bar 46 extending below the bar 47 to overlap the outer end of the angle 64 and receive the end of the angle in the corner between them. The bar 47 is riveted to the bar 46 and at the top, these two bars connect to the bars 40 and 41 as shown in Fig. 13, the bar 46 overlapping and being riveted to the bar 41. This completes the outer frame of the rear panel 3.

The inner frame of the panel comprises the bar 50 which at its left hand end in Fig. 12 is welded to the bar 51. The bar 51 in turn is at the bottom welded to the bar 52 which extends under it as shown in Fig. 14. At the opposite end, the bar 52 extends under the upright bar 53 to which it in turn is welded, (see Fig. 15) the bar 53 at the top being welded to the bar 50, thus forming the inner frame of the panel 3. See Fig. 13.

The panel 4 is formed with the inner and outer frames as follows: The outer frame has the angle 60 at the top to which is riveted the reinforcing bar 61. As shown in Fig. 13 the angle 60 is cut away at 60^A exposing the bar 61 to which is riveted the bar 62. On the bar 62 is riveted the bar 63, which abuts against the bar 61. At the bottom, the bars 62 and 63 terminate as is shown in Fig. 15, the bar 62 abutting against the angle, the angle being cut away at 64^A to receive it. The bars 65 and 66 overlap the bar 62 to which they are riveted. The bars 65 and 66 are riveted to the angle 64, the end of which projects into the corner between the bars 46 and 62, the bars 47 and 63 abutting against it from above as shown in Fig. 15. At the other end of the angle 64, the angle is cut away as at 64^B, (see Fig. 17), the bars 65 and 66 projecting beyond it. These bars overlap the facing angle 67 to which they are riveted. The angle 68 is riveted to the angle 67. The angle 67 extends below the angle 68 leaving space to receive the extended end of the angle 64. At the top the angle 67 extends beyond the angle 68 and overlaps the bar 61, where the angle 60 is cut away at 60^B to receive it. See Fig. 11. The angle 67 is riveted to the bar 61, thus closing the outer frame of panel number 4.

The inner frame of the panel 4 is made up of the top bar 70, see Figs. 11 and 13, the angle 71, see Figs. 2 and 15, the bottom bar 72, see Fig. 15 and the side angle 73, see Figs. 2 and 11, the angles abutting against the bars 70 and 72.

The parts so far described are assembled as follows: The base 1 is made up of four angles mitered at the corners and welded together. The angles 76, 77 and 78 are loose angles and are fastened to the respective panels 2, 3 and 4 by screws. The panels 2 and 3 are fastened together by a joint that is illustrated in Fig. 7. The angle 27 of panel 2 overlaps the plate 51 of panel 3 and the two parts are fastened together by screws. The angle 71 of the panel 4 overlaps the plate 53 and the two are fastened together by screws. At the front, the bar 80 projects into the opening in the panel 2 between the angle 10 and the angle 7 and a screw passes through the angle 10, bar 80 and into the angle 7, holding these parts together, screw holes being provided in these parts for this purpose. The bar 80 extends across from the panel 2 to the panel 4, with which it makes a similar joint as is shown in Fig. 11, in which a screw is passed through the angle 60 and the bar 80 into the angle 68. In front at the bottom, the panels 2 and 4 are connected to the base as is shown in Fig. 19, the angles 17 and 64 of said panels being fastened to the base by screws. To the base at the front and between the panels 2 and 3 is fastened the angle 86 by screws, to which in turn is riveted the bar 85 to which in turn is fastened by screws the angle 75. See Fig. 3. On the bar 80 is fastened the facing angle 87 in front and the strip 88 at the back which forms a stop for the doors. The angles 25 and 73 and the strip 88 form the inner side of the door casing at the two sides and top. These parts are covered with felt packing strips 89, 89 which make a tight joint with the doors, see Fig. 2.

I provide my improved case with doors, the construction of which will now be described.

The left hand door is shown in Fig. 20 and the right hand door in Fig. 21. The left hand door comprises an outer frame made up of the cross bars 100 and 101 at the top and bottom and the upright bars 102 and 103 at the sides. On the bar 100 is the reinforcing bar 104 and on the bar 101 is the reinforcing bar 105. These reinforcing bars overlap the upright bars 102 and 103. The bars 100, 102, 101 and 103 may be welded together at the corners and all of them are riveted to the bars 104 and 105, which tie the several bars together securely. Between the bars 104 and 105, are placed the bars 106 and 107, which together with the other parts just described, make up the outer frame of the door. The inner frame is made up of the bars 108, 109, 110 and 111 which are welded together at the corners. The door is left recessed at 112 and 111 to receive a felt packing strip therein.

The right hand door is built up as shown in Fig. 21 as follows: The outer frame of the door is made up of the cross bars 115 and 116 at the top and bottom with the upright bars 117 and 118 on the sides thereof. Inside of the frame are the reinforcing bars 119 at the top and 120 at the bottom. To the bar 119 are riveted the bars 118, 115 and 117. To the bar 120 are riveted the bars 117, 116 and 118. The bars 115, 117, 116 and 118 may be welded together at the corners if desired. The bar 121 fills the space between the bars 119 and 120 in the hinge stile and the bars 122 and 123 fill the space between the bars 119 and 120 in the lock stile. The bar 122 runs the full length of the door in the lock stile, and between the bars 122 and 123, the bolts 124 and 125 that lock the door to the casing are adapted to reciprocate.

The doors are both cut away on the hinge stiles so that the hinges will rest directly on and be attached to the reinforcing strips and lie flush with the outer edge of the inside and outside frames. The groove 126 in the hinge stile of the right hand door is provided to receive a felt packing strip but no groove need be provided in the lock stile as the felt packing strip on the lock stile of the left hand door is deemed sufficient. In both doors, the inner frames are fastened to the outer frames by screws, inclosing the glass plates between them. The reinforcing bars are thicker than the glass to provide for the packing strips 127 as shown in Fig. 2.

The right hand door carries the plate which overlaps the left hand door and closes the opening between them.

I cover my improved case with a top illustrated in Fig. 22 as follows: At the ends are provided the cross bars 131 and 132 against which abut the bars 133 and 134 which may be welded thereto. Riveted to the bar 134 is the bar 135 which overlaps the bars 131 and 132 to which it in turn is riveted. A similar bar 137 is riveted to the bar 133 and overlaps the bars 131 and 132 to which it is also riveted. Between the bars 135 and 137 are riveted the bars 136 and 138 to the bars 131 and 132 respectively, thus completing the outer frame.

The inner frame is made up of the end pieces 139 and 140 to which are welded the side pieces 141 and 142. The inner frame is fastened to the outer frame by screws inclosing the glass between them, room being left between the glass and outer frame for felt packing strips as shown in Fig. 3 at the top.

The bars 131, 132, 133 and 134 overlap, as shown in Figs. 3 and 22, the angles at the top of the panels, by which overlapping the top panel is thus supported.

Instead of the glass panel shown, a single sheet of metal can be used for the top panel.

Having thus described my invention, what I claim as new and patentable is as follows:

1. In an end panel for a show case the combination of an outer frame and an inner frame, both of said frames being rectangular in form, said outer frame having an angle bar at the top and bottom, a spacing bar fastened in the corner of each of said angle bars, an upright angle bar at one end of the panel connecting between the angle bars at the top and bottom of the show case, the angle bars at the top and bottom of the panel being cut away on the side at one end to receive the side of the upright angle bar, said upright angle bar overlapping the spacing bar and being fastened thereto.

2. In an end panel for a show case the combination of an outer frame and an inner frame, both of said frames being rectangular in form, said outer frame having an angle bar at the top and bottom, a spacing bar fastened in the corner of each of said angle bars, an upright angle bar at one end of the panel connecting between the angle bars at the top and bottom of the show case, the angle bars at the top and bottom of the panel being cut away on the side at one end to receive the side of the upright angle bar, said upright angle bar overlapping the spacing bar and being fastened thereto, said top and bottom angles being cut away at the side at the other end, a facing strip connecting between said angle bars and being fastened to the spacing bars.

3. An end panel for a show case having an outer frame rectangular in form, said frame having an angle bar at the top and bottom thereof, said angle bars being cut away on the side at each end, a spacing bar fastened in the corner of each of said angle bars, upright bars at each end of the panel connecting between the angle bars at the top and bottom and overlapping the spacing bars and being fastened thereto.

4. An end panel for a show case having an outer frame rectangular in form, said frame having an angle bar at the top and bottom thereof, said angle bars being cut away on the side at each end, a spacing bar fastened in the corner of each of said angle bars, upright bars at each end of the panel connecting between the angle bars at the top and bottom and overlapping the spacing bars and being fastened thereto, a spacing bar on each of said upright bars extending between the upper and lower angles, a rectangular inner frame fastened back of said spacing bars.

5. An end panel for a show case having an outer frame rectangular in form, said frame having an angle bar at the top and bottom thereof, said angle bars being cut away on the side at each end, a spacing bar fastened in the corner of each of said angle bars, upright bars at each end of the panel connecting between the angle bars at the top and bottom and overlapping the spacing bars and being fastened thereto, a spacing bar on each of said upright bars extending between the upper and lower angles, a rectangular inner frame fastened back of said spacing bars, a glass plate surrounded on the edges by said spacing bars and held between said inner and outer frames.

6. An end panel for a show case having an outer frame rectangular in form, said frame having an angle bar at the top and bottom thereof, each of said angle bars being cut away at one end, a spacing bar fastened in each of said angle bars, an upright angle bar connecting between the upper and lower angle bars and overlapping the spacing bars therein, an angle spacing bar fastened to said upright bar, said upright spacing bar stopping short of the top angle bar and leaving an interval therebetween to receive therein the end of an adjacent cross bar.

7. An end panel for a show case having an outer frame rectangular in form, said frame having an angle bar at the top and bottom thereof, each of said angle bars being cut away at one end, a spacing bar fastened in each of said angle bars, an upright angle bar connecting between the upper and lower angle bars and overlapping the spacing bars therein, an angle spacing bar fastened to said upright bar, said upright spacing bar stopping short of the top angle bar and leaving an interval therebetween to receive therein the end of an adjacent cross bar, a screw or pin passing through said top angle bar, the adjacent cross bar and the spacing angle, fastening all of said parts together.

8. In an end panel for a show case the combination of an outer and an inner frame, both of said frames being rectangular in form, said outer frame having an angle bar at the top and bottom and a spacing bar fastened in the corner of each of said angle bars, an upright angle bar at one end of the panel, connecting between the angle bars at the top and bottom, an upright facing bar connecting said angles together at the top and bottom at the other end, a spacing bar fastened to said upright facing bar, a spacing angle fastened to the upright angle, an inner rectangular frame fastened to said spacing bars, said frame having cross bars at the top, the upright angle bars on the sides connecting the cross bars, a plate of glass inclosed between said inner and outer frames.

9. A rear panel for a show case comprising an angle bar at the top and bottom, spacing bars fastened in the corners of said angles, said bars being cut away on the sides at each end, thereby exposing said spacing bars, upright facing bars connecting between said angle bars and fastened to the spacing bars therein, spacing bars carried on said facing bars.

10. A rear panel for a show case comprising an angle bar at the top and bottom, spacing bars fastened in the corners of said angles, said bars being cut away on the sides at each end, thereby exposing said spacing bars, upright facing bars connecting between said angle bars and fastened to the spacing bars therein, spacing bars carried on said facing bars, an inner rectangular frame composed of four bars fastened to said spacing bars, said outer and inner frames inclosing between them a plate of glass.

11. In a show case, the combination of end panels and a rear panel extending between them, each of said panels being made up of an inner and outer frame, said inner frames of the end panels having angles thereon which overlap the inner frame of the rear panel, to which angles the rear panels fasten.

12. In a show case, the combination of end panels and a rear panel, each of said end panels making a stepped joint with the rear panel, each of said panels having at the joint a facing bar, a spacing bar and an inner bar, the facing and spacing bars of the end panel overlapping the edge of the facing bar and the spacing bar of the rear panel, the inner bar of the end panel being an angle bar, one side of which overlaps the inner bar of the rear panel, the other side of which overlaps the spacing bar of the end panel and by which the two panels are fastened together.

13. In a show case, the combination of end panels, each of said panels having a recess therein between the top and a side member thereof, a cross bar connecting said panels, the ends thereof filling said recess, a pin or a screw passing through said top member, the cross bar, and into the side member of each of said end panels, fastening said end panels and said cross bar together.

14. In a show case, the combination of a pair of end panels, each of said panels having recesses therein between the top and bottom members thereof and one of the side members, two cross bars connecting said panels together at the top and bottom, the ends of said cross bars entering said recesses, pins or screws passing through the top and bottom members of said panels and through said cross bars.

15. In a show case, the combination of end panels having recesses therein at the top and bottom thereof, cross bars connecting said panels together at the top and bottom, the ends of said cross bars entering said recesses and being pinned therein, an angle iron fastened to said top cross bar and covering the top and outer side thereof when lying flush with the tops of the end panels, an angle bar fastened to the bottom cross bar and covering the bottom and outer side thereof, doors hinged to the end panels and swinging between said top and bottom cross bars and filling the interval therebetween, a strip fastened to the top cross bar and projecting outwardly therefrom, forming a stop for said doors.

16. In a show case, the combination of a base, panels having angles at the bottom thereof fastened on three sides of said base, an angle bar having a spacing strip fastened thereto on the other side of said base, a series of angle bars fastened one to the base of each of said panels and an angle bar fastened to said spacing bar, a platform supported by said series of angle bars and filling the base of the case.

17. In a show case, the combination of three panels joined together at the corners and inclosing three sides of a rectangular case, bars connecting the free ends of two of said panels at the top and bottom, doors hinged on the free ends of two of said panels and filling the opening between them, stops mounted on each of said bars and overlapping the doors forming stops for the doors.

18. In a show case, the combination of three panels joined together at the corners and inclosing three sides of a rectangular case, bars connecting the free ends of two of said panels at the top and bottom, doors hinged on the free ends of two of said panels and filling the opening between them, stops mounted on each of said bars and overlapping the doors forming stops for the doors, packing strips on the overlapping parts of said stops filling the interval between them and the doors.

19. In a show case, the combination of three panels joined together at the corners and inclosing three sides of a rectangular case, bars connecting the free ends of two of said panels at the top and bottom, doors hinged on the free ends of two of said panels and filling the opening between them, said doors having hinge stiles made up of an outer and an inner strip with a spacing strip between them, said facing strips projecting beyond the facing strips on the hinge side thereof, said facing strips being recessed to permit the fastening of the hinge directly to the facing strips, said facing strips between the hinges being filled with packing material.

20. In a panel for a show case, the combination of two angle bars placed at right angles to each other, spacing strips fastened in the corner of each of said angle bars, one of said angle bars being cut away on the side at the end, the other angle bar surrounding the extended end of the first angle bar on two sides, the spacing strip of the first angle bar overlapping the second bar and being fastened thereto.

21. In a panel for a show case, the combination of two angle bars placed at right angles to each other, spacing strips fastened in the corner of each of said angle bars, one of said angle bars being cut away on the side at the end, the other angle bar surrounding the extended end of the first angle bar on two sides, the spacing strip of the first angle bar overlapping the second bar and being fastened thereto, the spacing strip of the second bar being left short to leave a recess between the end thereof and the extended end of the first angle bar, a connecting bar having its end projecting into said recess and fastened between said extended end and the short spacing strip.

22. In a top panel for a show case, the combination of a pair of wide facing strips, a pair of spacing bars connecting said facing strips together, wide facing strips covering the intermediate portion of said facing bars, spacing panels fastened to said first named facing strips and filling the interval between the spacing strips connected thereto, said facing strips and spacing strips forming the outer frame of a panel, an inner frame for said panel fastened to said spacing strips, said outer frame and said inner panel being capable of supporting a plate of glass between them.

23. In a top panel for a shown case, the combination of a pair of wide facing strips, a pair of spacing bars connecting said facing strips together, wide facing strips covering the intermediate portion of said facing bars, spacing bars fastened to said first named facing strips and filling the interval between the spacing strips connected thereto, said facing strips and spacing strips forming the outer frame of a panel, an inner frame for said panel fastened to said spacing strips, said outer frame and said inner panel being capable of supporting a plate of glass between them, said outer facing strips overlapping the spacing strips and the facing strips of the inner frame and furnishing a support for the panel.

24. In a door for a show case, the combination of two layers of facing strips inclosing a layer of spacing strips there between, each of said layers being composed of four strips, the strips of the outer layers being similarly placed and breaking joints with the spacing strips.

25. In a door for a show case, the combination of two layers of facing strips inclosing a layer of spacing strips there between, each of said layers being composed of four strips, the strips of the outer layers being similarly placed and breaking joints with the spacing strips, the facing strips of both layers projecting inwardly over the spacing strips and being capable of inclosing a glass plate between them.

26. In a door for a show case, the combination of two layers of facing strips inclosing a layer of spacing strips there between, each of said layers being composed of four strips, the strips of the outer layers being similarly placed and breaking joints with the spacing strips, the facing strips in two opposite sides projecting outwardly over the spacing strips and inclosing packing material between them.

27. In a door for a show case, the combination of two layers of facing strips inclosing a layer of spacing strips there between, each of said layers of facing strips having four strips therein, the layer of spacing strips having two strips spaced apart on one side and single strips on each of the other sides, the strips of the outer layers being similarly placed and breaking joints with the spacing strips, one of said spacing strips, together with the adjacent facing strips forming the hinge stile of the door, the two spacing strips spaced apart together with the adjacent facing strips forming a lock stile for the door, bolts mounted to travel between said spacing strips.

In testimony whereof I affix my signature in presence of two witnesses.

ERIK EKEDAHL.

Witnesses:
   H. D. HERPST,
   H. D. JAMESON.